United States Patent [19]
Moriarty, Jr.

[11] Patent Number: 5,912,812
[45] Date of Patent: Jun. 15, 1999

[54] BOOST POWER CONVERTER FOR POWERING A LOAD FROM AN AC SOURCE

[75] Inventor: John Klinge Moriarty, Jr., Reading, Pa.

[73] Assignee: Lucent Technologies Inc., Murray Hill, N.J.

[21] Appl. No.: 08/769,984

[22] Filed: Dec. 19, 1996

[51] Int. Cl.⁶ .................................................. H02M 3/335
[52] U.S. Cl. ................................ 363/89; 363/17; 363/98; 315/DIG. 5
[58] Field of Search .................................. 363/89, 60, 61, 363/17, 98; 315/DIG. 5, DIG. 7

[56] References Cited

U.S. PATENT DOCUMENTS

| | | | |
|---|---|---|---|
| 5,113,337 | 5/1992 | Steigerwald | 363/98 |
| 5,235,504 | 8/1993 | Sood | 363/53 |
| 5,307,004 | 4/1994 | Carsten | 323/222 |
| 5,371,439 | 12/1994 | Griffin | 315/DIG. 5 |
| 5,408,403 | 4/1995 | Nerone et al. | 363/89 |
| 5,488,269 | 1/1996 | El-Hamamsy et al. | 315/307 |
| 5,615,101 | 3/1997 | Moriarty | 363/101 |
| 5,686,798 | 11/1997 | Mattas | 315/DIG. 7 |
| 5,712,536 | 1/1998 | Haas et al. | 315/DIG. 7 |

OTHER PUBLICATIONS

U.S. Application Serial No. 08/365,656, filed Dec. 29, 1994, Allowed Aug. 30, 1996, (Moriarty 3), entitled "Power Converter With High Power Factor".

J. Moriarty et al, "New Integrated Electronic Balast Chip Set", *Proceedings of the Twenty–ninth International Power Conversion Conference*, Sep. 1994, pp. 280–287.

"High Power Factor Preregulator", *Product & Applications Handbook* 1993–1994, by Unitrod Integrated Circuits, pp. 5–218 to 5–225.

*Primary Examiner*—Robert E. Nappi
*Assistant Examiner*—Derek J. Jardieu

[57] ABSTRACT

A boost power converter for powering a load with an AC source is disclosed. The boost power converter comprises an AC to DC conversion circuit, a resonator, and a boost circuit. The resonator includes an energy storage device and a resonant circuit, and alternately applies energy from the energy storage device to the resonant circuit for powering the load. The AC to DC conversion circuit generates a DC signal in response to the AC source. The boost circuit includes a choke for receiving the DC signal, a rectifier for electrically coupling the choke to the energy storage device, and a switching device for selectively coupling the choke to the resonant circuit for charging and discharging the choke. The resonator operates in full resonant mode with zero voltage switching. The boost power converter is well-suited for ballast applications that drive a fluorescent lamp.

32 Claims, 4 Drawing Sheets

FIG. 4

BOOST POWER CONVERTER FOR POWERING A LOAD FROM AN AC SOURCE

FIELD OF THE INVENTION

The invention relates generally to power converters, and more particularly to a power converter with a boost circuit for powering a load from an AC source. The invention is well-suited for resonant ballast applications.

DESCRIPTION OF RELATED ART

The two primary functions of a fluorescent lamp ballast are well known. First, to create enough voltage to start the lamp, and second, to limit the current once the lamp is started. For many years, both functions of a fluorescent lamp ballast were achieved by the use of magnetics, with a transformer to step up the voltage and a choke to limit the current.

In recent years, electronic ballasts have been frequently used instead of magnetic ballasts to control fluorescent lamps and other non-linear loads. Compared to magnetic ballasts, electronic ballasts are smaller and lighter, do not have flicker associated with 60 Hz power mains, and are more efficient. Electronic ballasts are especially desirable for powering the compact, consumer fluorescent lamps that are becoming more popular.

Most compact electronic ballasts consist of discrete components, including power transistors and pulse transformers. A typical electronic ballast includes a half bridge totem pole driver formed from two discrete power MOSFETs of bipolar transistors. The half bridge output drives a resonant load by means of feedback from a pulse transformer whose primary winding is connected in series with the load. The two secondary windings of the transformer are connected to the inputs of the two half bridge transistors such that the load is driven synchronously. The LC resonating elements provide substantially sinusoidally varying voltage and/or current waveforms. Driving the load in such a self-synchronous fashion allows a switching frequency at the load that is much higher than the line frequency. As a result, much smaller reactive components may be used to reduce the bulk and size of the ballast.

A disadvantage of typical electronic ballasts is a low power factor. That is, the current drawn from the power source is out-of-phase with the voltage of the source. Typically the current leads the voltage, e.g., by approximately 50 to 60%. The low power factor is largely due to a peak detector rectifier which allows power to be drawn from the source only when the source voltage is higher than the load voltage. The low power factor not only wastes energy, but tends to inject high frequency harmonics into the line. The total harmonic distortion might violate FCC regulations and/or disrupt other circuits connected to the line. A large capacitor in shunt with the line reduces total harmonic distortion, but is also likely to reduce the power factor.

A buck-boost power converter which operates with a high power factor is disclosed in U.S. application Ser. No. 08/365, 656, filed Dec. 29, 1994, by J. Moriarty, entitled "Power Converter With High Power Factor", which is assigned to the assignee of the present invention and incorporated herein by reference. A similar buck-boost power converter is disclosed in J. Moriarty et al., "New Integrated Electronic Ballast Chip Set", *Proceedings of the Twenty-ninth International Power Conversion Conference*, September 1994, pp. 280–287, which is incorporated by reference. These buck-boost power converters are simple to control, and have a high power factor since current drawn from the source to charge a choke is in phase with the voltage of the source. A disadvantage, however, is that high peak currents result in high power dissipation and harmonic distortion.

Therefore, a need exists for a power converter which operates with a high power factor and low harmonic distortion.

SUMMARY OF THE INVENTION

A primary aspect of the invention is boost power converter for powering a load with an AC source.

In one embodiment of the invention, a boost power converter comprises: an AC to DC conversion circuit for generating a DC signal in response to the AC source; a resonator, including an energy storage device and a resonant circuit, configured for alternately applying energy from the energy storage device to the resonant circuit for powering the load; and a boost circuit including a choke for receiving the DC signal, a rectifier for electrically coupling the choke to the energy storage device, and a switching device for selectively coupling the choke to the resonant circuit.

Preferably, the resonator operates in a fully resonant mode with zero voltage switching between a high voltage of the energy storage device and ground, and the boost circuit operates in a quasi-resonant mode with low slew rates. The power converter is well-suited for ballast applications in which the load is a fluorescent lamp.

In another embodiment of the invention, a boost power converter comprises: (a) an AC to DC conversion circuit; (b) a resonator for applying an alternating voltage to the load, the resonator including (i) a resonant circuit including a coil and a capacitor; (ii) a first switching device and a second switching device, each electrically coupled to the resonant circuit and configured for zero voltage switching; and (iii) an energy storage device electrically coupled to the first switching device; (c) a choke electrically coupled to the AC to DC conversion circuit; and (d) a third switching device electrically coupled between the choke and the resonant circuit.

Preferably, a power factor correction controller charges the choke with a unidirectional source current in phase with the source voltage, and discharges the choke into the energy storage device. The power factor correction controller discharges the charged choke by opening the third switching device in response to the source current and source voltage. Since the source current flows through the choke during both charge and discharge, the peak current is reduced.

It is also preferred that the first and second switching devices zero voltage switch the resonant circuit between a high voltage of the energy storage device and ground, at approximately a 50% duty cycle. Preferably, the high voltage is larger than the peak voltage of the AC source. Furthermore, the choke can also be zero voltage switched from the high voltage to ground for quasi-resonant operation.

In a preferred configuration, the first, second, and third switching devices and the resonant circuit are electrically coupled to a node, with a first rectifier electrically coupled between the AC to DC conversion circuit and the choke, and a second rectifier electrically coupled between the choke and the energy storage device. If desired, the first and second rectifiers are diodes, the first, second and third switching devices are transistors, the energy storage device is a second capacitor, and the AC to DC conversion circuit is a full wave rectifier.

Advantageously, a power converter according to the present invention can utilize a power factor correction controller to control a boost circuit coupled to a fully resonant ballast to provide a quasi-resonant boost circuit with low slew rates. In this manner, the power converter achieves both a high power factor and low harmonic distortion. The zero voltage switching, quasi-resonant operation also provides reduced switching losses, reduced stresses, and improved power efficiency.

BRIEF DESCRIPTION OF THE DRAWING

The invention, together with its various features and advantages, can be readily understood from the following detailed description taken in conjunction with the accompanying drawing, in which.

DETAILED DESCRIPTION

Figure 1:
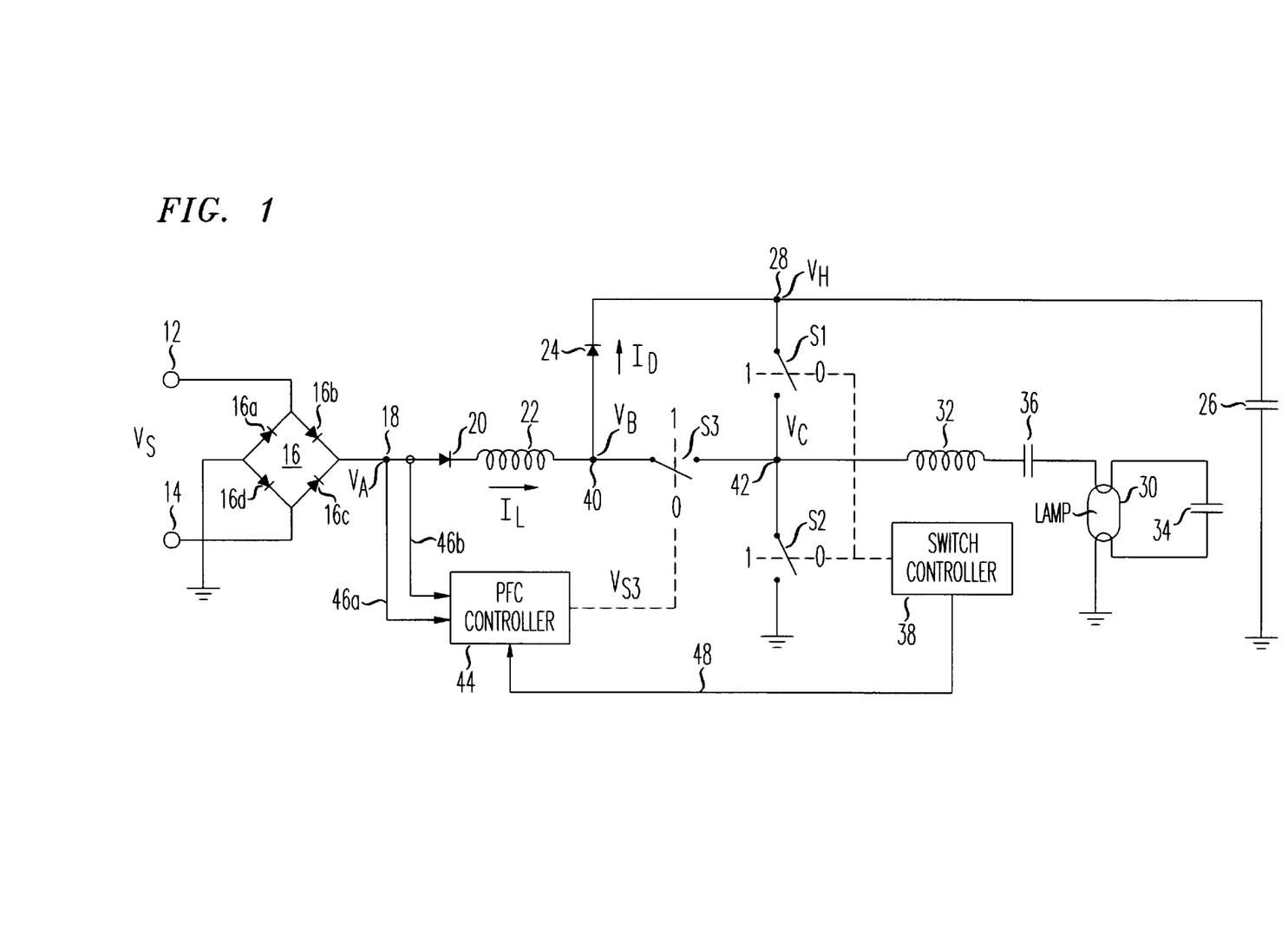
FIG. 1 is a simplified schematic diagram of a boost power converter according to an embodiment of the present invention.

FIG. 1 is a simplified schematic diagram of a boost power converter according to an embodiment of the present invention. Power converter 10 is adapted to receive an alternating source voltage $V_S$ from an external power source. Power converter 10 is also adapted to receive a load, in this case a fluorescent lamp, and to power the load with an alternating voltage. Source voltage $V_S$ is applied to input terminals 12 and 14 by an AC power source (not shown), such as a 60 Hz, 110 volt main line. Full wave rectifier (FWR) 16, consisting of four diodes 16a, 16b, 16c and 16d is connected across terminals 12 and 14 for rectifying AC source voltage $V_S$ into a full wave DC rectified voltage $V_A$ at node 18. The DC voltage may include an AC component as long as the DC voltage, when averaged over time, is not zero. FWR 16 is connected through diode 20 to choke 22. Choke 22 provides a boosted-up voltage through diode 24 to capacitor 26. Capacitor 26 provides an energy storage device that stores a high voltage $V_H$ at node 28. High voltage $V_H$ is in the range of approximately 215 to 225 volts, and therefore, is substantially larger than the peak of source voltage $V_S$. Lamp 30 is configured to receive power from a resonant circuit that includes resonant coil 32 and resonant capacitor 34. DC blocking capacitor 36 provides appropriate voltage shifting for lamp 30.

Upper switch S1 is connected between capacitor 26 and the resonant circuit, and lower switch S2 is connected between the resonant circuit and ground. Upper switch S1 is alternatively switched with lower switch S2 at a constant frequency to provide alternating current flow through the resonant circuit and lamp 30. When switch S1 is closed and switch S2 is opened, high voltage $V_H$ is applied to coil 32. When switch S1 is open and switch S2 is closed, zero voltage is applied to coil 32. Switches S1 and S2 are preferably high voltage gating or switching devices such as one or more transistors. Switch controller 38 operates switches S1 and S2 at a switching frequency that corresponds to the predetermined resonant frequency of the resonant circuit. Preferably, switches S1 and S2 operate at approximately a 50% duty cycle.

Switches S1 and S2 also operate with zero voltage switching. That is, a brief time interval (dead time) is provided between turning off switch S1 and turning on switch S2, and between turning off switch S2 and turning on switch S1. During dead time between turning off switch S1 and turning on switch S2, energy stored in coil 32 is discharged through lamp 30 instead of being pulled through switch S2 to ground. Likewise, during dead time between turning off switch S2 and turning on switch S1, energy stored in coil 32 is discharged through lamp 30 instead of being pulled through switch S1 to capacitor 26. Zero voltage switching is desirable because the capacitive energy stored in the switches is not dissipated through the switching action. The combination of switches S1 and S2, capacitor 26, coil 32 and capacitor 34, and switch controller 38 provides a resonator which operates in a fully resonant mode for powering lamp 30.

A boost circuit includes switch S3 connected between nodes 40 and 42, and power factor correction (PFC) controller 44, in conjunction with diode 24 and capacitor 26. PFC controller 44 operates switch S3 in response to rectified voltage $V_A$ at node 18, choke current $I_L$ through node 18 (and through choke 22), and a control signal from switch controller 38. In particular, PFC controller 44 senses the voltage and current at node 18 via sense lines 46a and 46b, respectively, and receives a control signal from switch controller 38 via signal line 48. PFC controller 44 regulates choke current $I_L$ so that choke current $I_L$ is directly proportional to rectified voltage $V_A$. Choke current $I_L$ discharges through diode 24 into capacitor 26 to provide high voltage $V_H$.

In operation, switch S3 closes at substantially the same time that switch S1 closes, shortly after switch S2 opens. In this configuration, voltage $V_B$ (at node 40) and resonant voltage $V_C$ (at node 42) are pulled to high voltage $V_H$ (at node 28). Since high voltage $V_H$ is greater than rectified voltage $V_A$ (at node 18), diode 20 is reverse-biased, and choke 22 is prevented from charging. Thereafter, switch S1 opens while switch S3 remains closed, voltages $V_B$ and $V_C$ are pulled to ground, and choke 22 begins to charge. After switch S1 opens, but before switch S2 closes (dead time), voltages $V_B$ and Vc are reduced non-abruptly by the resonant circuit. Thereafter, switch S2 closes, voltages $V_B$ and $V_C$ are grounded, and choke 22 is coupled directly to ground and charges. In this way, switch S3 takes advantage of the zero voltage switching at node 42, so that the boost circuit need not "hard switch" to ground.

PFC controller 44 determines when choke 22 should transition from charging to discharging in response to rectified voltage $V_A$ and choke current $I_L$. PFC controller 44 causes choke 22 to discharge by opening switch S3 while switch S1 remains open and switch S2 remains closed. When switch S3 opens, node 40 is decoupled from ground, voltage $V_B$ rises rapidly to approximately high voltage $V_H$, and choke current $I_L$ begins to discharge through diode 24 into capacitor 26. As choke 22 discharges, switches S1 and S3 close and switch S2 opens, however, this does not substantially affect choke 22 since voltages $V_A$ and $V_B$ are largely unaffected. Choke 22 finishes discharging while switches S1 and S3 remain closed and switch S2 remains open. At this point, voltage $V_B$ is larger than voltage $V_A$, and diode 20 prevents capacitor 26 from discharging through choke 22 into FWR 16. Choke 22 charges again when switch S1 opens and switch S2 closes during the next cycle. In this manner, PFC controller 44 provides an efficient power factor correction scheme by assuring that choke current $I_L$ is in phase with rectified voltage $V_A$.

Diode 20 has a relatively high reverse breakdown voltage and a fast reverse recovery time to prevent capacitor 26 from dumping a significant amount of current back into the line (through terminals 12 and 14). Although diodes 16b and 16c could be selected to satisfy these performance requirements, it is generally more cost-effective to include a single diode 20 so that diodes 16b and 16c can be relatively inexpensive devices which need not satisfy these requirements.

PFC controller 44 is slaved to switch controller 38. That is, switch controller 38 opens and closes switching devices S1 and S2 at a switching frequency that provides efficient power transfer to the resonant circuit, and PFC controller 44 operates switch S3 to accommodate the switching frequency. For example, PFC controller 44 operates switch S3 so that that switch S3 closes (goes from opened to closed) while switch S1 closes and switch S2 is open, and switch S3 opens (goes from closed to opened) while switch S1 is open and switch S2 is closed. Switches S1 and S3 close at substantially the same time by switch controller 38 sending synchronous signals to switch S1 and PFC controller 44. Furthermore, since choke current $I_L$ increases when resonant voltage $V_C$ is zero, the maximum permitted duty cycle of choke current $I_L$ is inversely proportional to the duty cycle of resonant voltage $V_C$.

If desired, an optional capacitor (not shown) can be connected between node 42 and ground to further limit the slew rate of resonant voltage $V_C$.

Figure 2:
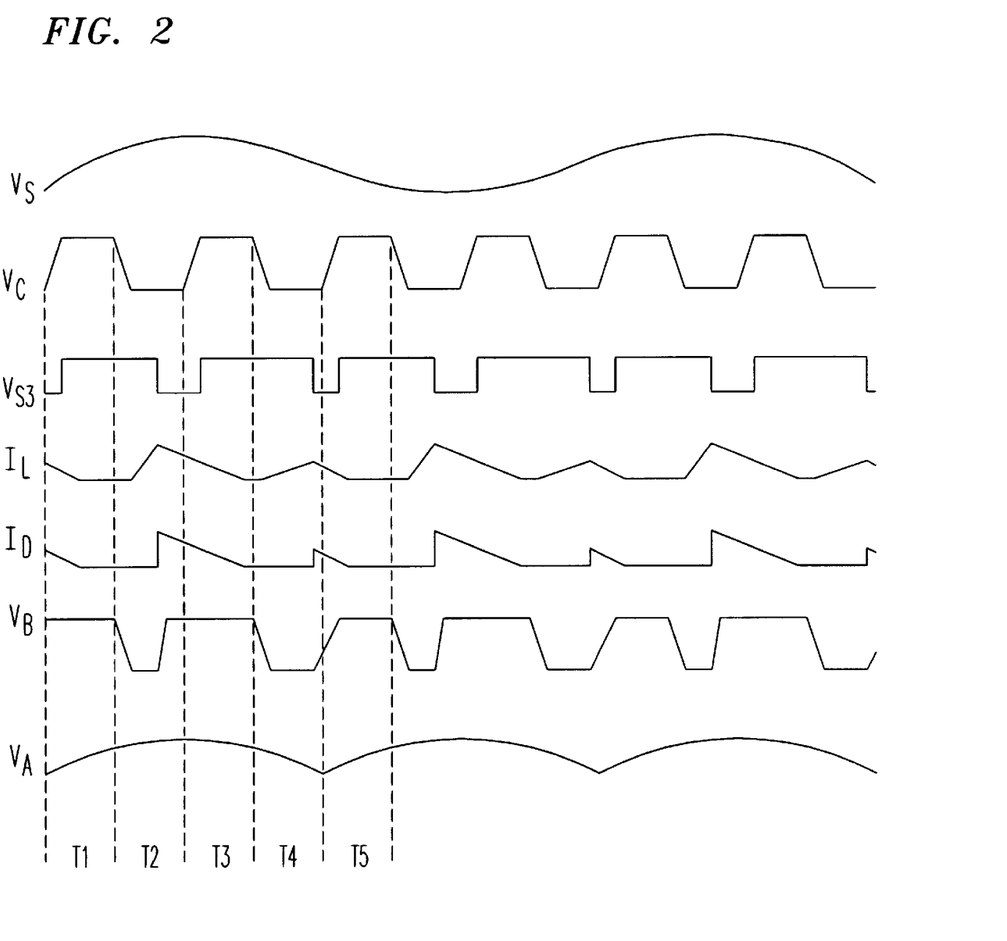
FIG. 2 is a waveshape diagram illustrating signal waveshapes of the boost power converter of FIG. 2.

FIG. 2 is a waveshape diagram illustrating signal waveshapes of power converter 10. With reference to FIG. 1, source voltage $V_S$ is applied between terminals 12 and 14, rectified voltage $V_A$ occurs at node 18, voltage $V_B$ occurs at node 40, resonant voltage $V_C$ occurs at node 42, high voltage $V_H$ occurs at node 28, choke current $I_L$ flows unidirectionally through choke 22, diode current $I_D$ flows unidirectionally through diode 24, and control voltage $V_{S3}$ is a control signal sent from PFC controller 44 to switch S3. When control voltage $V_{S3}$ is high then switch S3 is closed, and when control voltage $V_{S3}$ is low then switch S3 is open. During operation, high voltage $V_H$ is always larger than rectified voltage $V_A$.

The resonator provides resonant voltage $V_C$. When switch S1 is turned on (closed) and switch S2 is turned off (open), resonant voltage $V_C$ is at high voltage $V_H$. Likewise, when switch S1 is turned off (open) and switch S2 is turned on (closed), resonant voltage $V_C$ is at ground and is zero. Resonant voltage $V_C$ has sloped rising and falling edges due to the zero voltage switching of switches S1 and S2.

At the beginning of time period T1 switch S2 is opened, and shortly thereafter, switches S1 and S3 are closed. For convenience of explanation, capacitor 26 is already charged to high voltage $V_H$. Therefore, resonant voltage $V_C$ rises to high voltage $V_H$. As choke 22 discharges from a previous cycle (not shown), currents $I_L$ and $I_D$ go to zero. Since rectified voltage $V_A$ is less than voltage $V_B$, diode 20 is reverse-biased, and choke current $I_L$ remains zero after discharge occurs.

At the beginning of time period T2 switch S1 is opened, and shortly thereafter, switch S2 is closed, and resonant voltage $V_C$ falls to zero. Since switch S3 remains closed, voltage $V_B$ follows resonant voltage $V_C$ to ground, and rectified voltage $V_A$ becomes larger than voltage $V_B$. As a result, choke current $I_L$ rises, and energy is stored in choke 22 according to the formula $$V_{choke}=L(di/dt)$$

where $V_{choke}$ is the differential voltage $V_A-V_B$, di/dt is the rate of change of choke current $I_L$, and L is the inductance of choke 22. Thus, choke 22 begins to charge at substantially the same time that resonant voltage $V_C$ is pulled to ground. Diode current $I_D$ remains zero since voltage $V_B$ at ground reverse-biases diode 24.

Later during time period T2, PFC controller 44 determines that choke 22 has charged long enough. Accordingly, PFC controller 44 lowers control voltage $V_{S3}$ to open switch S3. Opening switch S3 causes choke 22 to discharge its stored energy through diode 24 into capacitor 26. As a result, voltage $V_B$ rises to approximately high voltage $V_H$. In particular, voltage $V_B$ rises to high voltage $V_H$ less the threshold voltage of diode 24, which is assumed to be negligible. As choke 22 discharges, choke current $I_L$ decreases and diode current $I_D$ follows choke current $I_L$. Since rectified voltage $V_A$ is relatively high during time period T2, choke current $I_L$ charges at a relatively high rate and discharges at a relatively low rate.

At the beginning of time period T3 switch S2 is opened, and shortly thereafter switches S1 and S3 are closed. As a result, resonant voltage $V_C$ rises to high voltage $V_H$. Since voltages $V_A$ and $V_B$ are largely unaffected, choke 22 continues to discharge at essentially the same relatively low rate as in time period T2. For convenience of explanation, it is assumed that the choke current continues to discharge through diode 24 into capacitor 26, and diode current $I_D$ continues to match choke current $I_L$. It is understood, however, that a portion of choke current $I_L$ may actually flow through switch S3, and that another portion of choke current $I_L$ (whether through diode 24 of switch S3) may discharge into the resonant circuit. The precise current flow will depend on the relative resistances of various circuit elements. In any event, later during time period T3, choke 22 is fully discharged and currents $I_L$ and $I_D$ go to zero. The discharge of choke 22 provides the boost voltage to store high voltage $V_H$ in capacitor 26.

At the beginning of time period T4 switch S1 is opened, and shortly thereafter switch S2 is closed and resonant voltage $V_C$ is taken to ground. While control voltage $V_{S3}$ remains high, switch S3 remains closed, voltage $V_B$ follows resonant voltage $V_C$ to ground, and rectified voltage $V_A$ becomes larger than voltage $V_B$. Therefore, choke current $I_L$ rises and choke 22 begins to charge. Later during time period T4, PFC controller 44 lowers control voltage $V_{S3}$ which opens switch S3, causing voltage $V_B$ to rise, and choke 22 discharges through diode 24 into capacitor 26. The declining choke current $I_L$ is matched by diode current $I_D$. Since rectified voltage $V_A$ is relatively low during time period T4, choke current $I_L$ charges at a relatively slow rate and discharges at a relatively high rate.

At the beginning of time period T5 switch S2 is opened, and shortly thereafter switches S1 and S3 are closed. As a result, resonant voltage $V_C$ rises to high voltage $V_H$. Since voltages $V_A$ and $V_B$ are largely unaffected, choke 22 continues to discharge at essentially the same relatively high rate as in time period T4. Eventually during time period T5, choke 22 fully discharges and currents $I_L$ and $I_D$ go to zero.

Rectified voltage $V_A$ is larger during time period T2 than during time period T4. As a result, PFC controller 44 permits choke current $I_L$ to attain a higher peak during time period T2 than during time period T4. Since choke current $I_L$ charges at a greater rate during time period T2 than during time period T4, PFC controller 44 opens switch S3 (by lowering control voltage $V_{S3}$) earlier during time period T2 than during time period T4. Thus, choke current $I_L$ has a shorter charge duration during time period T2 than during time period T4. Likewise, since choke current $I_L$ discharges from a larger peak and at a slower rate during time periods T2 and T3 than during time periods T4 and T5, choke current $I_L$ takes longer to discharge during time period T3 than during time period T5, even though the discharge begins sooner during time period T2 than during time period T4. Furthermore, both the relatively high and low charge and discharge rates of choke 22 occur at a low slew rate, which avoids significant harmonic distortion.

It can be seen that the cycle-by-cycle average of choke current $I_L$ is higher at the higher portion of rectified voltage $V_A$. Thus, the current drawn from the power source is approximately in direct phase relation with the voltage of the power source.

It is apparent to one skilled in the art that the direct phase relation improves as the switching frequency of switches S1, S2 and S3 increases. FIG. 2 is therefore drawn to facilitate better understanding of the invention, but in actual operation, the switching frequencies of switches S1, S2 and S3 are much higher in comparison to the power source than as appears in FIG. 2.

Figure 3:
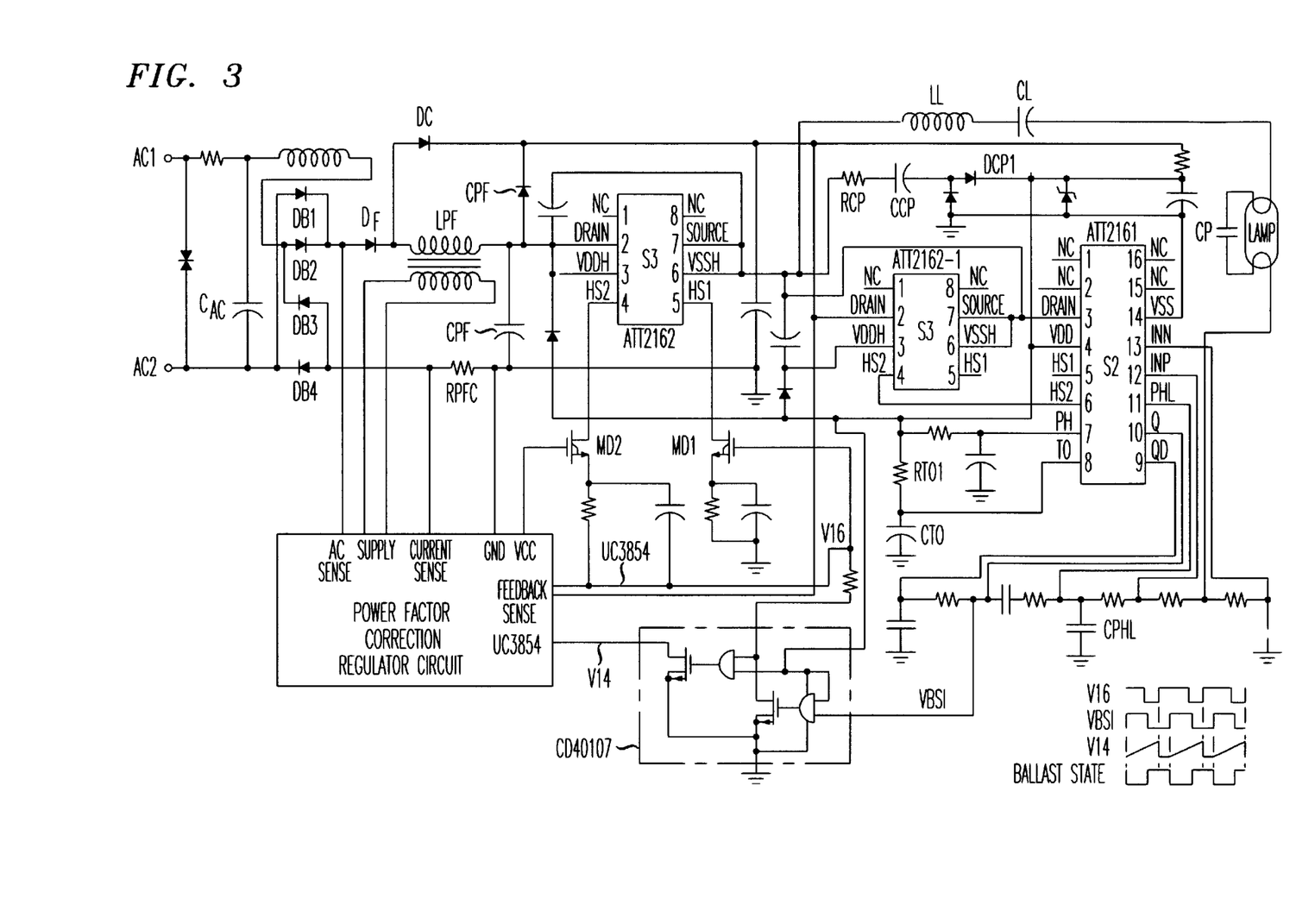
FIG. 3 is a schematic diagram of an implementation of the boost power converter of FIG. 1.
Figure 4:
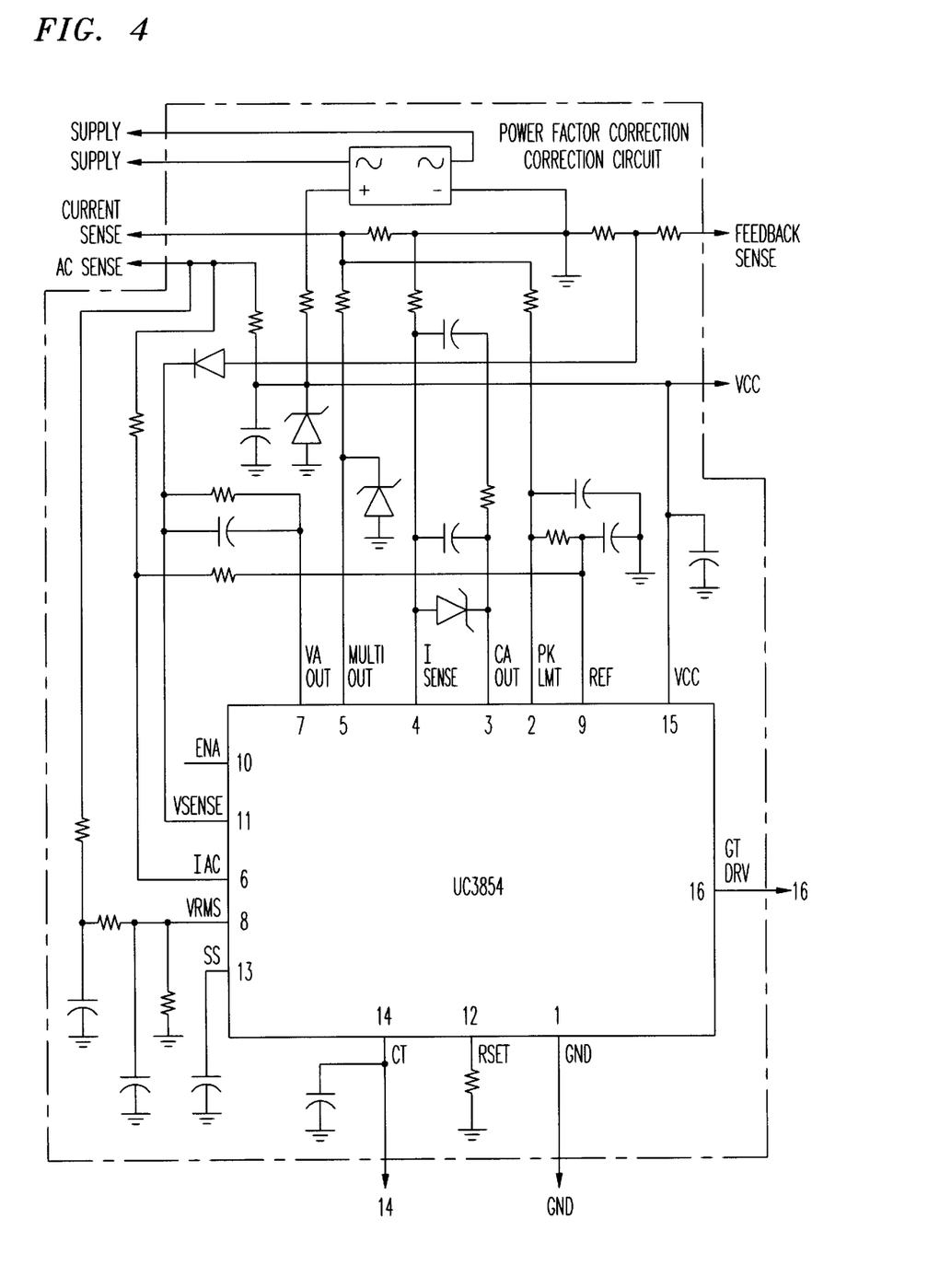
FIG. 4 is a schematic diagram of an implementation of the power factor correction regulator circuit of FIG. 3.

FIG. 3 is a schematic diagram of an implementation of power converter 10, and FIG. 4 is a schematic diagram of an implementation of the PFC regulator circuit in FIG. 3. Related components in FIG. 1 are noted parenthetically. Input terminals AC1 (12) and AC2 (14) receive power from an AC source. A bridge rectifier (16) is formed by four diodes DB1 to DB4 (16a–16d). Diode DF (20) couples the bridge rectifier to boost inductor coil LPF (22), which is coupled through diode DPF (24) to capacitor CHV (26). Two high side ballast chips, such as model ATT2162 available from AT&T Corp., are used as switches S1 and S3. Accordingly, a first ATT2162 (ATT2162-1) provides switch S1, and a second ATT2162 (ATT2162-2) provides switch S3. A low side ballast chip, such as model ATT2161 available from AT&T Corp., is used as switch S2. The ATT2162-1 includes a high voltage FET to implement the high side (positive rail) switch S1, and the ATT2161 includes a high voltage FET to implement the low side (ground) switch S2 in a fully resonant ballast. The ATT2161 also includes timing control circuitry for switching with appropriate dead times for zero voltage switching, and level shifting circuits to level shift outputs for proper interface to the ATT2162-1. Capacitor CTO and resistor RTO1 provide the oscillation or clock to the ATT2161 and ATT2162-1.

The PFC regulator circuit (44) includes a high power factor preregulator, such as model UC3854 available from Unitrode Corp., and associated circuitry. A logic circuit, such as model CD40107 available from Harris Corp, is coupled to the PFC regulator circuit. Resonant coil LL (32) and resonant capacitor CF (34) provide the resonant circuit for the lamp (30), and capacitor CL (36) provides DC blocking for the lamp.

Diode DF is a fast, high-voltage diode that isolates the quasi-resonant boost circuit from the bridge rectifier, and allows the bridge rectifier output voltage to be sensed by the PFC regulator circuit at pin AC sense. That is, Diode DF prevents the boost circuit from corrupting the bridge rectifier output voltage. As a result, the bridge rectifier output voltage represents the absolute instantaneous value of the AC line voltage.

Switch S3 is closed by applying a negative current pulse to pin HS1 of the ATT2162-2, and opened by applying a negative current pulse to pin HS2 of the ATT2162-2. The PFC regulator circuit controls switch S3 by coupling pin 16 of the UC3854 to level shifting transistors MD1 and MD2, which are coupled to pins HS1 and HS2, respectively, of the ATT2162-2.

The PFC regulator circuit operates at a constant frequency, set by a sawtooth oscillator integrated within the UC3854 whose voltage ramp is applied to pin 14 of the UC3854. The CD40107 synchronizes the UC3854 operating frequency to the ballast frequency. Synchronization is depicted by voltage wavefroms V16 (pin 16), VBS1 (inverse of ballast state), and V14 (pin 14). Synchronization is accomplished by delaying the initiation of the voltage ramp after reset until the ballast enters the low state (switch S1 is open and switch S2 is closed), at which time waveform VBS1 goes high. When the ballast enters the low state, choke current begins to flow through coil LPF. The UC3854 senses the choke current through resistor RPFC. When the UC3854 determines that the choke current has reached the appropriate value, pin 16 goes low thereby opening switch S3, although the voltage ramp continues to rise. When the voltage ramp reaches its peak value, pin 16 goes high thereby closing switch S3, and the voltage ramp is reset to zero. The CD40107 holds the voltage ramp at zero until the ballast enters the low state again.

The operating frequency of the UC3854 is set between the limits of one and two times the ballast frequency so that the ballast will be in the high state (switch S1 closed and switch S2 open) when the voltage ramp reaches its peak. In this manner, switch S3 has zero voltage across it when it closes.

Based on the foregoing, the construction and operation of FIGS. 3 and 4 will be apparent to those skilled in the art. Further details regarding the PFC regulator circuit are set forth in "High Power Factor Preregulator", *Product & Applications Handbook* 1993–1994 by Unitrode Integrated Circuits, pp. 5-218 to 5-225, which is incorporated by reference.

A method for powering a load with an AC signal is apparent from the foregoing. The method includes applying the AC signal to an AC to DC conversion circuit for generating a DC signal, applying the DC signal to a choke, selectively coupling the choke to a resonant circuit, applying a boosted voltage from the choke to an energy storage device, and alternately applying energy from the energy storage device to the resonant circuit for powering the load. The method may include, for instance, coupling the choke to the resonant circuit to begin charging the choke with the DC signal, decoupling the choke from the resonant circuit to begin discharging the choke through a rectifier into the energy storage device, and alternately applying energy by zero voltage switching.

The boost power converter of the present invention can be implemented with many other configurations. For instance, other AC to DC conversion circuits can be used, a battery can provide the energy storage device, other rectifiers can replace diodes 20 and 24, and the boost circuit can be operated in a continuous mode. As mentioned above, diode 20 is optional. In addition, switch S3 can be closed at any time while switch S1 is closed. The invention is well suited for driving a variety of loads, including high-intensity discharge lamps.

It is understood that while the present invention has been described in terms of several illustrative embodiments, other arrangements and methods of operation will be apparent to those of ordinary skill in the art. Therefore, the invention should be limited only by the spirit and scope of the appended claims.

The invention claimed is:

1. A boost power converter for powering a load with an AC source, comprising:
   an AC to DC conversion circuit for generating a DC signal in response to the AC source;
   a resonator, including first and second switching devices, an energy storage device and a resonant circuit, configured for alternately applying energy from the energy storage device to the resonant circuit for powering the load; and a boost circuit including a choke for receiving the DC signal, a rectifier for electrically coupling the choke to the energy storage device, and a third switching device, coupled between the choke and a node between the first and second switching devices, for selectively coupling the choke to the resonant circuit.

2. The power converter of claim 1, in which the resonator is configured for fully resonant, zero voltage switching.

3. The power converter of claim 2, in which the resonator is configured for alternately switching the resonant circuit between a high voltage of the energy storage device and ground.

4. The power converter of claim 3, in which the load includes a fluorescent lamp.

5. A boost power converter for powering a load with an AC source, comprising:

(a) an AC to DC conversion circuit;

(b) a resonator for applying an alternating voltage to the load, the resonator including:

(i) a resonant circuit including a coil and a capacitor;

(ii) a first switching device and a second switching device, each electrically coupled to the resonant circuit and configured for zero voltage switching; and (iii) an energy storage device electrically coupled to the first switching device;

(c) a choke electrically coupled to the AC to DC conversion circuit; and (d) a third switching device electrically coupled between the choke and a node between the first and second switching devices.

6. The power converter of claim 5, in which the third switching device is configured to remain closed when the first switching device opens and when the second switching device closes.

7. The power converter of claim 5, in which the third switching device is configured to close at substantially the same time that the first switching device closes.

8. The power converter of claim 5, further including a power factor correction controller configured to cause a unidirectional current through the choke in phase with a voltage of the AC source.

9. The power converter of claim 8, in which the power factor correction controller is configured for opening the third switching device, in response to a rectified voltage from the AC to DC conversion circuit and the current through the choke, while the first switching device is open and the second switching device is closed, in order to discharge the choke and provide a high power factor.

10. The power converter of claim 5, in which the first and second switching devices are configured to zero voltage switch the resonant circuit between a high voltage of the energy storage device and ground.

11. The power converter of claim 10, in which the first, second and third switching devices are configured to zero voltage switch the choke from the high voltage to ground.

12. The power converter of claim 5, in which the AC to DC conversion circuit is a full wave rectifier.

13. The power converter of claim 5, in which the first, second, and third switching devices and the resonant circuit are each electrically coupled to a node.

14. The power converter of claim 5, further including a first rectifier electrically coupled between the AC to DC conversion circuit and the choke, and a second rectifier electrically coupled between the choke and the energy storage device.

15. A boost power converter for powering a load with an AC source, comprising:

an AC to DC conversion circuit;

a choke;

first and second rectifiers;

a resonant circuit including a coil and a capacitor;

first, second and third switching devices;

a switch controller configured for operating the first and second switching devices at approximately a resonant frequency of the resonant circuit;

a power factor correction controller configured for operating the third switching device; and an energy storage device configured for receiving energy from the AC source and for providing energy to the load;

wherein first and second input terminals of the AC to DC conversion circuit are adapted to receive first and second output terminals of the AC source, a first output terminal of the AC to DC conversion circuit is electrically coupled to an input terminal of the first rectifier, an output terminal of the first rectifier is electrically coupled to a first end of the choke, a second end of the choke is electrically coupled to an input terminal of the second rectifier and to a first end of the third switching device, an output terminal of the second rectifier is electrically coupled to a first end of the first switching device and to a first end of the energy storage device, a second end of the third switching device is electrically coupled to a second end of the first switching device and to a first end of the second switching device and to a first end of the resonant circuit, a second end of the resonant circuit is adapted to receive a first end of the load, and a second end of the second switching device is electrically coupled to a second end of the energy storage device and to a second output terminal of the AC to DC conversion circuit.

16. The power converter of claim 15, in which the first and second rectifiers are diodes, the first, second and third switching devices include transistors, and the energy storage device is a second capacitor.

17. The power converter of claim 15, in which the AC to DC conversion circuit is a full wave rectifier.

18. The power converter of claim 15, in which the load includes a fluorescent lamp.

19. The power converter of claim 15, in which the energy storage device receives energy from the AC source through the AC to DC conversion circuit, the first rectifier, the choke, and the second rectifier, and the energy storage device provides energy to the load through the first switch and the resonant circuit.

20. The power converter of claim 15, in which the second ends of the second switch and the energy storage device and the second output terminal of the AC to DC conversion circuit are configured to be electrically coupled to ground.

21. The power converter of claim 20, in which the first and second switching devices are configured for alternately switching the first and second ends of the energy storage device to the resonant circuit.

22. The power converter of claim 21, in which the first and second switching devices are configured for zero voltage resonant switching.

23. The power converter of claim 22, in which the first and second switching devices are configured for switching at approximately a 50% duty cycle.

24. The power converter of claim 22, in which the first end of the energy storage device is configured to provide a high voltage that is higher than a peak voltage of the AC source.

25. The power converter of claim 22, in which the power factor correction controller is configured to cause a unidirectional current through the choke in phase with a voltage of the AC source.

26. The power converter of claim 25, in which the power factor correction controller is configured for opening the third switching device, in response to a rectified voltage from the AC to DC conversion circuit and the current through the choke, while the first switching device is open and the second switching device is closed, in order to discharge the choke and provide a high power factor.

27. The power converter of claim 25, in which the third switching device is configured to close while the second switching device is open, and the third switching device is configured to open while the first switching device is open and the second switching device is closed.

28. The power converter of claim 27, in which the third switching device is configured to close while the first switching device is closed.

29. The power converter of claim 27, in which the third switching device is configured to close at substantially the same time that the first switching device closes.

30. A method for powering a load with an AC signal, comprising:
   applying the AC signal to an AC to DC conversion circuit for generating a DC signal;
   applying the DC signal to a choke;
   selectively coupling the choke to a node between first and second switching devices of a resonant circuit;
   applying a boosted voltage from the choke to an energy storage device; and
   alternately applying energy from the energy storage device to the resonant circuit for powering the load.

31. The method of claim 30, in which
   selectively coupling the choke includes coupling the choke to the resonant circuit to begin charging the choke with the DC signal,
   applying the boosted voltage includes decoupling the choke from the resonant circuit to discharge the choke through a rectifier into the energy storage device, and
   alternately applying the energy includes zero voltage switching.

32. The method of claim 30, in which the load includes a fluorescent lamp.

* * * * *